(12) United States Patent  (10) Patent No.: US 7,037,121 B1
Gray, Jr.  (45) Date of Patent: May 2, 2006

(54) PRINTED CIRCUIT BOARD ASSEMBLY WITH POWER COVER

(75) Inventor: William R. Gray, Jr., Westminster, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 10/899,549

(22) Filed: Jul. 27, 2004

Related U.S. Application Data

(60) Provisional application No. 60/509,375, filed on Oct. 7, 2003.

(51) Int. Cl.
H01R 13/44 (2006.01)
(52) U.S. Cl. ...................... 439/135; 439/76.1
(58) Field of Classification Search .............. 439/76.1, 439/135, 148–149, 940
See application file for complete search history.

(56) References Cited

U.S. PATENT DOCUMENTS

| | | | | |
|---|---|---|---|---|
| 4,197,945 A | * | 4/1980 | Sherwood | 206/706 |
| 4,396,245 A | * | 8/1983 | Lane | 439/148 |
| 4,857,017 A | * | 8/1989 | Erk | 439/695 |
| 5,026,295 A | * | 6/1991 | Fong et al. | 439/135 |
| 5,106,313 A | * | 4/1992 | Lwee et al. | 439/135 |
| 5,571,022 A | * | 11/1996 | Schaarschmidt | 439/135 |
| 5,601,444 A | * | 2/1997 | Cox | 439/299 |
| 5,735,697 A | * | 4/1998 | Muzslay | 439/83 |
| 6,015,305 A | * | 1/2000 | McHugh et al. | 439/135 |
| 6,135,795 A | * | 10/2000 | Ho et al. | 439/135 |
| 6,908,342 B1 | * | 6/2005 | Shimada | 439/630 |
| 2005/0159032 A1 | * | 7/2005 | Shue et al. | 439/135 |

FOREIGN PATENT DOCUMENTS

| | | | |
|---|---|---|---|
| JP | 2-44673 | * | 2/1990 |
| JP | 5-144514 | * | 11/1993 |

* cited by examiner

*Primary Examiner*—Michael C. Zarroli
(74) *Attorney, Agent, or Firm*—Marsh Fischmann & Breyfogle LLP

(57) ABSTRACT

A printed circuit board assembly (120) for a peripheral is disclosed. Components of the printed circuit board assembly (120) include a printed circuit board (122), a power connector plug (124) having a first cavity (158) with a plurality of power pins (162), and a cover (174) that is disposed within the first cavity (158). There is an interference fit or the like between an outer perimeter of the cover (174) and a connector housing (128) of the power connector plug (124). Each of the power pins (162) is disposed within a corresponding hole (206) on a first end (182) of the cover (174) that is preferably sized so that the pins (162) do not contact the cover (174). Each such hole (206) has a closed end such that the cover (174) individually encloses at least an end portion of each power pin (162).

38 Claims, 11 Drawing Sheets

PRINTED CIRCUIT BOARD ASSEMBLY WITH POWER COVER

CROSS-REFERENCE TO RELATED APPLICATIONS

This patent application claims priority under 35 U.S.C. §119(e) to U.S. Patent Application Ser. No. 60/509,375, that is entitled "HDD Power Cover," that was filed on Oct. 7, 2003, and the entire disclosure of which is incorporated by reference in its entirety herein.

FIELD OF THE INVENTION

The present invention generally relates to the field of printed circuit board assemblies that may be installed in a peripheral and, more particularly, to a cover for a connector plug of such a printed circuit board assembly.

BACKGROUND OF THE INVENTION

Various types of computer peripherals (e.g., disk drives, floppy drives, CD-ROMs) may use what may be characterized as a printed circuit board assembly of some type. Components of such a printed circuit board assembly include a printed circuit board and at least one connector that is appropriately mounted on the printed circuit board. This connector may include a plurality of pins that are electrically connected with electrical contacts and/or traces that are formed on the printed circuit board, and thereby such is commonly referred to as a "plug." Another connector (commonly referred to as a "receptacle" when it has the female electrical contacts) may be interconnected with the plug, for instance to provide power from a power supply to the printed circuit board.

It is common at least in the disk drive industry to assemble a printed circuit board assembly at one location, and then ship the printed circuit board assembly to a different location for incorporation into a disk drive. One or more of the pins of the printed circuit board assembly may become damaged during handling and/or shipment of the printed circuit board assembly. Personnel that handle these printed circuit board assemblies also may be injured by coming into contact with the pins as well. Some printed circuit board assembly connectors may include a number of sets of pins. One or more of these sets may not be used at certain times.

BRIEF SUMMARY OF THE INVENTION

The present invention is generally directed to a cover for a connector plug having a plurality of pins. One application of the invention is in the form of a printed circuit board assembly having a printed circuit board, the noted connector plug, and the noted cover. Although the present invention will be discussed with regard to this particular application, it should be appreciated that the various features to be discussed herein regarding the cover, or the combination of the cover and the connector plug, may be presented for any application or presented independently of any particular application.

A first aspect of the present invention is embodied by a printed circuit board assembly having a printed circuit board, a connector plug (e.g., power connector plug) that is appropriately mounted on the printed circuit board, and a cover that interfaces with the connector plug. The connector plug includes a connector housing, a first cavity that intersects with an exterior surface or outer perimeter of the connector housing and that extends within the connector housing, and a plurality of pins (e.g., power pins) that are at least partially disposed in the first cavity. The cover is at least partially disposed in the first cavity and is engaged by at least a portion of the connector housing. None of the pins of the connector plug are contacted by the cover. That is, the entirety of the pins is separated from the cover by an open space when the cover and connector plug are interconnected in the case of the first aspect.

Various refinements exist of the features noted in relation to the first aspect of the present invention. Further features may also be incorporated in the first aspect of the present invention as well. These refinements and additional features may exist individually or in any combination. The printed circuit board may be of any appropriate size, shape, and configuration, may include any type and arrangement of electrical components, and may be formed from any appropriate material or combination of materials. The connector plug may be mounted on the printed circuit board in any appropriate manner, may be of any appropriate size, shape, and configuration, and may be formed from any appropriate material or combination of materials. The focus of the first aspect is more on the relationship between the cover and connector plug.

The cover is preferably detachably or removably interconnected with the connector plug in the case of the first aspect. That is, the cover may be installed within the connector plug or removed as desired/required. There a number of characterizations that may be made in relation to the interface between the cover and the connector plug when fully interconnected. One is that there is an interference fit between the outer perimeter of the cover and the connector housing. Another is that there is a snap-lock interconnection between the outer perimeter of the cover and the connector housing. Yet another is that the cover is compressed between opposing portions of the connector housing when installed in the first cavity of the connector plug. In any case, preferably the cover does not "rattle" when the cover and connector plug are fully interconnected. That is, preferably the cover is maintained in a stationary position relative to the connector plug when fully interconnected, including when moving or shaking the connector plug by hand.

Each of the above-noted characterizations of the interface between the connector plug and cover are encompassed by the cover including at least one recess on its outer perimeter, and by the connector housing including a protrusion for each such recess. Each such protrusion may extend from the connector housing within the first cavity, may be disposed/seated within a corresponding recess on the outer perimeter of the cover, and may exert a force on the outer perimeter of the cover by being in contact with the cover. One way in which this may be done is by having the connector housing at least generally elastically deflect when the cover is being directed within the first cavity. The resulting attempt by the connector housing to return to its undeformed or undeflected state may then provide the forces that are exerted on the cover by the connector housing. Preferably, the connector housing remains elastically deformed when each protrusion of the connector housing is seated within its corresponding recess on the outer perimeter of the cover. In one embodiment, at least one recess is formed on both the top and bottom of the cover, and a corresponding protrusion of the connector housing is disposed in each such recess. Preferably, each recess on the top of the cover is vertically aligned with a recess on the bottom of the cover such that opposing forces are exerted on the top and bottom of the cover to place the cover in compression.

Although the cover could include a single cavity for collectively receiving each of the pins of the connector plug in the case of the first aspect, preferably the cover instead includes a plurality of individual and discrete holes for receiving at least an end portion of each of these pins. A first end of the cover may include such a plurality of holes, and preferably the opposite end of each such hole is closed. Stated another way, each such hole preferably does not extend all the way to a second end of the cover that is located opposite of the first end. In one embodiment, both the first and second ends of the cover are in the form of a planar surfaces, with the plurality of holes intersecting with the first end, but not the second end. Another way of characterizing the cover having such a plurality of holes is that the cover is in the form of a solid body, and that the only internal cavities within this solid body are the plurality of holes for accommodating receipt of a corresponding pin of the connector plug. Another characterization is that a volume of the cover extending between the top and bottom of the cover at a location between each adjacent pair of holes is occupied by a material that defines the cover, preferably along the entire length of each such hole. Yet another characterization is that both the top and bottom of the cover extend at least the full length of each of the plurality of holes, and there are no open spaces in the cover between any adjacent pair of holes along the entire length dimension of each such hole.

The cover is preferably in the form of a rigid body that does not deflect to any substantial degree when being engaged by the connector plug in the case of the first aspect. This facilitates using compressive forces of the above-noted type as the primary forces to retain the interconnection between the cover and connector plug. Although the cover may be formed from any appropriate material or combination of materials, in one embodiment the cover is in the form of a polymer.

The cover may be directed into the first cavity such that it is flush with the end of the connector housing having the first cavity or recessed inwardly of this end in the case of the first aspect (i.e., preferably, the cover does not protrude beyond the connector plug after being installed). As such, it would be at least difficult, if not impossible, to remove the cover by hand. In this regard, the outer perimeter of the cover may be adapted to facilitate the removal of the cover from the connector plug. For instance, a tool may be inserted into a space between the outer perimeter of the cover and the connector housing and then manipulated to deflect the connector housing, and thereby displace one or more of the above-noted protrusions of the connector housing out of their corresponding recess on the outer perimeter of the cover. In one embodiment, a slot is formed on the top of the cover, the bottom of the cover, or both, for receiving an appropriate tool (e.g. a flat tip screwdriver) that may be used to remove the cover from the connector plug. Any such slot may be of any appropriate size and/or configuration for increasing the size of the gap between the cover and the connector plug to the desired degree for receipt of a cover removal tool. In one embodiment, each such slot extends from the above-noted second end of the cover at least toward the above-noted first end of the cover, but in any case preferably at least along the entire length of each such hole. Another positional feature is that each such slot may be centrally located between adjacent pairs of holes on the top and/or bottom of the cover in the lateral dimension, although the slot and the corresponding pair of holes may and more typically will be offset in the vertical dimension.

The cover may be configured such that it may be positioned within the connector plug in either of first or second orientations in accordance with the first aspect. That is, the cover may be installed in the connector plug "right side up" or may be installed within the connector plug "upside down." In one embodiment, the connector housing includes a pair of chamfered corners, and each of the four corners of the connector housing are chamfered or beveled to accommodate multiple orientations of the cover within the connector plug. Stated another way, the cover may have an upper half that is the mirror image of the lower half to accommodate the cover being disposed in the connector plug either with its top being disposed above its bottom, or with its bottom being disposed above its top.

A second aspect of the present invention is embodied by a printed circuit board assembly having a printed circuit board, a connector plug (e.g., power connector plug) that is appropriately mounted on the printed circuit board, and a cover that interfaces with the connector plug. The connector plug includes a connector housing, a first cavity that intersects with an exterior surface or outer perimeter of the connector housing and that extends within the connector housing, and a plurality of pins (e.g., power pins) that are at least partially disposed in the first cavity. The cover is at least partially disposed in the first cavity, and an interference fit exists between the outer perimeter of the cover and the connector housing. A majority of the forces that retain the interconnection between the cover and connector plug are provided by the above-noted interference fit.

Various refinements exist of the features noted in relation to the second aspect of the present invention. Further features may also be incorporated in the second aspect of the present invention as well. These refinements and additional features may exist individually or in any combination. The printed circuit board may be of any appropriate size, shape, and configuration, may include any type and arrangement of electrical components, and may be formed from any appropriate material or combination of materials. The connector plug may be mounted on the printed circuit board in any appropriate manner, may be of any appropriate size, shape, and configuration, and may be formed from any appropriate material or combination of materials. The focus of the second aspect is more on the relationship between the cover and connector plug.

The cover is preferably detachably or removably interconnected with the connector plug in the case of the second aspect. That is, the cover may be installed within the connector plug or removed as desired/required. There a number of characterizations that may be made in relation to the above-noted interference fit between the cover and connector plug. One is that about 100% of the forces that retain the cover relative to the connector plug may be provided by the noted interference fit. Another is that there may be a snap-lock interconnection between the outer perimeter of the cover and the connector housing. Yet another is that the cover may be compressed between opposing portions of the connector housing when installed in the first cavity of the connector plug. In any case, preferably the cover does not "rattle" when the cover and connector plug are fully interconnected. That is, preferably the cover is maintained in a stationary position relative to the connector plug when fully interconnected, including when moving or shaking the connector plug by hand.

Each of the above-noted characterizations of the interface between the connector plug and cover are encompassed by the cover including at least one recess on its outer perimeter, and by the connector housing including a protrusion for each such recess. Each such protrusion may extend from the connector housing within the first cavity, may be disposed/ seated within a corresponding recess on the outer perimeter of the cover, and may exert a force on the outer perimeter of the cover by being in contact with the cover. One way in which this may be done is by having the connector housing at least generally elastically deflect when the cover is being directed within the first cavity. The resulting attempt by the connector housing to return to its undeformed or undeflected state may then provide the forces that are exerted on the cover by the connector housing. Preferably, the connector housing remains elastically deformed when each protrusion of the connector housing is seated within its corresponding recess on the outer perimeter of the cover. In one embodiment, at least one recess is formed on both the top and bottom of the cover, and a corresponding protrusion of the connector housing is disposed in each such recess. Preferably, each recess on the top of the cover is vertically aligned with a recess on the bottom of the cover such that opposing forces are exerted on the top and bottom of the cover to place the cover in compression.

Although the cover could include a single cavity for collectively receiving each of the pins of the connector plug in the case of the second aspect, preferably the cover instead includes a plurality of individual and discrete holes for receiving at least an end portion of each of these pins. A first end of the cover may include such a plurality of holes, and preferably the opposite end of each such hole is closed. Stated another way, each such hole preferably does not extend all the way to a second end of the cover that is located opposite of the first end. In one embodiment, both the first and second ends of the cover are in the form of a planar surfaces, with the plurality of holes intersecting with the first end, but not the second end. Another way of characterizing the cover having such a plurality of holes is that the cover is in the form of a solid body, and that the only internal cavities within this solid body are the plurality of holes for accommodating receipt of a corresponding pin of the connector plug. Another characterization is that a volume of the cover extending between the top and bottom of the cover at a location between each adjacent pair of holes is occupied by a material that defines the cover, preferably along the entire length of each such hole. Yet another characterization is that both the top and bottom of the cover extend at least the full length of each of the plurality of holes, and there are no open spaces in the cover between any adjacent pair of holes along the entire length dimension of each such hole.

The cover is preferably in the form of a rigid body that does not deflect to any substantial degree when being engaged by the connector plug in the case of the second aspect. This facilitates using compressive forces of the above-noted type as the primary forces to retain the interconnection between the cover and connector plug. Although the cover may be formed from any appropriate material or combination of materials, in one embodiment the cover is in the form of a polymer.

The cover may be directed into the first cavity such that it is flush with the end of the connector housing having the first cavity or recessed inwardly of this end in the case of the second aspect (i.e., preferably, the cover does not protrude beyond the connector plug after being installed). As such, it would be at least difficult, if not impossible, to remove the cover by hand. In this regard, the outer perimeter of the cover may be adapted to facilitate the removal of the cover from the connector plug. For instance, a tool may be inserted into a space between the outer perimeter of the cover and the connector housing and then manipulated to deflect the connector housing, and thereby displace one or more of the above-noted protrusions of the connector housing out of their corresponding recess on the outer perimeter of the cover. In one embodiment, a slot is formed on the top of the cover, the bottom of the cover, or both, for receiving an appropriate tool (e.g. a flat tip screwdriver) that may be used to remove the cover from the connector plug. Any such slot may be of any appropriate size and/or configuration for increasing the size of the gap between the cover and the connector plug to the desired degree for receipt of a cover removal tool. In one embodiment, each such slot extends from the above-noted second end of the cover at least toward the above-noted first end of the cover, but in any case preferably at least along the entire length of each such hole. Another positional feature is that each such slot may be centrally located between adjacent pairs of holes on the top and/or bottom of the cover in the lateral dimension, although the slot and the corresponding pair of holes may and more typically will be offset in the vertical dimension.

The cover may be configured such that it may be positioned within the connector plug in either of first or second orientations in accordance with the second aspect. That is, the cover may be installed in the connector plug "right side up" or may be installed within the connector plug "upside down." In one embodiment, the connector housing includes a pair of chamfered corners, and each of the four corners of the connector housing are chamfered or beveled to accommodate multiple orientations of the cover within the connector plug. Stated another way, the cover may have an upper half that is the mirror image of the lower half to accommodate the cover being disposed in the connector plug either with its top being disposed above its bottom, or with its bottom being disposed above its top.

A third aspect of the present invention is embodied by a printed circuit board assembly having a printed circuit board, a connector plug (e.g., power connector plug) that is appropriately mounted on the printed circuit board, and a cover that interfaces with the connector plug. The connector plug includes a connector housing, a first cavity that intersects with an exterior surface or outer perimeter of the connector housing and that extends within the connector housing, and a plurality of pins (e.g., power pins) that are at least partially disposed in the first cavity. The cover is at least partially disposed in the first cavity, and includes: 1) a top and a bottom that are oppositely disposed; 2) first and second sides that are oppositely disposed; and 3) first and second ends that are oppositely disposed. The first end of the cover includes a plurality of holes that extend within the cover to a closed end. Both the top and bottom of the cover include at least one recess. The connector housing includes a protrusion for each such recess, and each protrusion extends within the first cavity, is disposed in its corresponding recess, and contacts the cover. The retention force collectively provided by the engagement between the various protrusions and the cover is greater than any collective force provided by each pin that may be in engagement or contact with the cover.

Various refinements exist of the features noted in relation to the third aspect of the present invention. Further features may also be incorporated in the third aspect of the present invention as well. These refinements and additional features may exist individually or in any combination. The printed circuit board may be of any appropriate size, shape, and configuration, may include any type and arrangement of electrical components, and may be formed from any appropriate material or combination of materials. The connector plug may be mounted on the printed circuit board in any appropriate manner, may be of any appropriate size, shape, and configuration, and may be formed from any appropriate material or combination of materials. The focus of the third aspect is more on the relationship between the cover and connector plug.

The cover is preferably detachably or removably interconnected with the connector plug in the case of the third aspect. That is, the cover may be installed within the connector plug or removed as desired/required. There a number of characterizations that may be made in relation to the interface between the cover and connector plug. One is that about 100% of the forces that retain the cover relative to the connector plug may be provided by the protrusions of the connector housing being engaged with the outer perimeter of the cover while being disposed within their corresponding recess. Another is that there may be an interference fit between the protrusions of the connector housing and an outer perimeter of the cover. Yet another is that the cover may be compressed between opposing portions of the connector housing when installed in the first cavity of the connector plug. In any case, preferably the cover does not "rattle" when the cover and connector plug are fully interconnected. That is, preferably the cover is maintained in a stationary position relative to the connector plug when fully interconnected, including when moving or shaking the connector plug by hand.

Each protrusion of the connector housing in the case of the third aspect may extend from the connector housing within the first cavity, may be disposed/seated within a corresponding recess on the outer perimeter of the cover, and may exert a force on the outer perimeter of the cover by being in contact with the cover. One way in which this may be done is by having the connector housing at least generally elastically deflect when the cover is being directed within the first cavity. The resulting attempt by the connector housing to return to its undeformed or undeflected state may then provide the forces that are exerted on the cover by the connector housing. Preferably, the connector housing remains elastically deformed when each protrusion of the connector housing is seated within its corresponding recess on the outer perimeter of the cover. Moreover, preferably, each recess on the top of the cover is vertically aligned with a recess on the bottom of the cover such that opposing forces are exerted on the top and bottom of the cover to place the cover in compression.

Although the cover could include a single cavity for collectively receiving each of the pins of the connector plug in the case of the third aspect, preferably the cover instead includes a plurality of individual and discrete holes for receiving at least an end portion of each of these pins. A first end of the cover may include such a plurality of holes, and preferably the opposite end of each such hole is closed. Stated another way, each such hole preferably does not extend all the way to a second end of the cover that is located opposite of the first end. In one embodiment, both the first and second ends of the cover are in the form of a planar surfaces, with the plurality of holes intersecting with the first end, but not the second end. Another way of characterizing the cover having such a plurality of holes is that the cover is in the form of a solid body, and that the only internal cavities within this solid body are the plurality of holes for accommodating receipt of a corresponding pin of the connector plug. Another characterization is that a volume of the cover extending between the top and bottom of the cover at a location between each adjacent pair of holes is occupied by a material that defines the cover, preferably along the entire length of each such hole. Yet another characterization is that both the top and bottom of the cover extend at least the full length of each of the plurality of holes, and that there are no open spaces in the cover between any adjacent pair of holes along the entire length dimension of each such hole. In any case, preferably none of the pins contact any portion of the cover. That is, preferably the entirety of each pin is disposed in spaced relation to the cover.

The cover is preferably in the form of a rigid body that does not deflect to any substantial degree when being engaged by the connector plug in the case of the third aspect. This facilitates using compressive forces of the above-noted type as the primary forces to retain the interconnection between the cover and connector plug. Although the cover may be formed from any appropriate material or combination of materials, in one embodiment the cover is in the form of a polymer.

The cover may be directed into the first cavity such that it is flush with the end of the connector housing having the first cavity or recessed inwardly of this end in the case of the third aspect (i.e., preferably, the cover does not protrude beyond the connector plug after being installed). As such, it would be at least difficult, if not impossible, to remove the cover by hand. In this regard, the outer perimeter of the cover may be adapted to facilitate the removal of the cover from the connector plug. For instance, a tool may be inserted into a space between the outer perimeter of the cover and the connector housing and then manipulated to deflect the connector housing, and thereby displace one or more of the above-noted protrusions of the connector housing out of their corresponding recess on the outer perimeter of the cover. In one embodiment, a slot is formed on the top of the cover, the bottom of the cover, or both, for receiving an appropriate tool (e.g. a flat tip screwdriver) that may be used to remove the cover from the connector plug. Any such slot may be of any appropriate size and/or configuration for increasing the size of the gap between the cover and the connector plug to the desired degree for receipt of a cover removal tool. In one embodiment, each such slot extends from the above-noted second end of the cover at least toward the above-noted first end of the cover, but in any case preferably at least along the entire length of each such hole. Another positional feature is that each such slot may be centrally located between adjacent pairs of holes on the top and/or bottom of the cover in the lateral dimension, although the slot and the corresponding pair of holes may and more typically will be offset in the vertical dimension.

The cover may be configured such that it may be positioned within the connector plug in either of first or second orientations in accordance with the third aspect. That is, the cover may be installed in the connector plug "right side up" or may be installed within the connector plug "upside down." In one embodiment, the connector housing includes a pair of chamfered corners, and each of the four corners of the connector housing are chamfered or beveled to accommodate multiple orientations of the cover within the connector plug. Stated another way, the cover may have an upper half that is the mirror image of the lower half to accommodate the cover being disposed in the connector plug either with its top being disposed above its bottom, or with its bottom being disposed above its top.

DETAILED DESCRIPTION OF THE INVENTION

Figure 1:
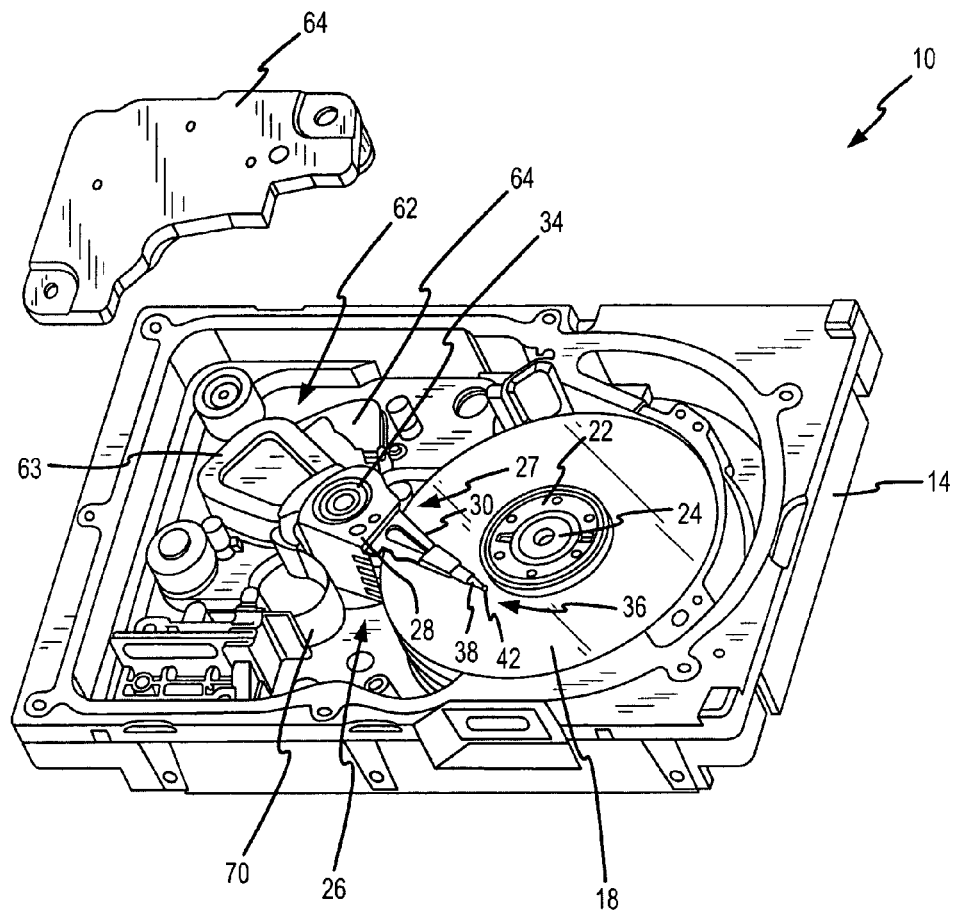
FIG. 1 is a perspective view of a prior art disk drive that may be adapted to incorporate a printed circuit board assembly with a power plug cover.
Figure 2:
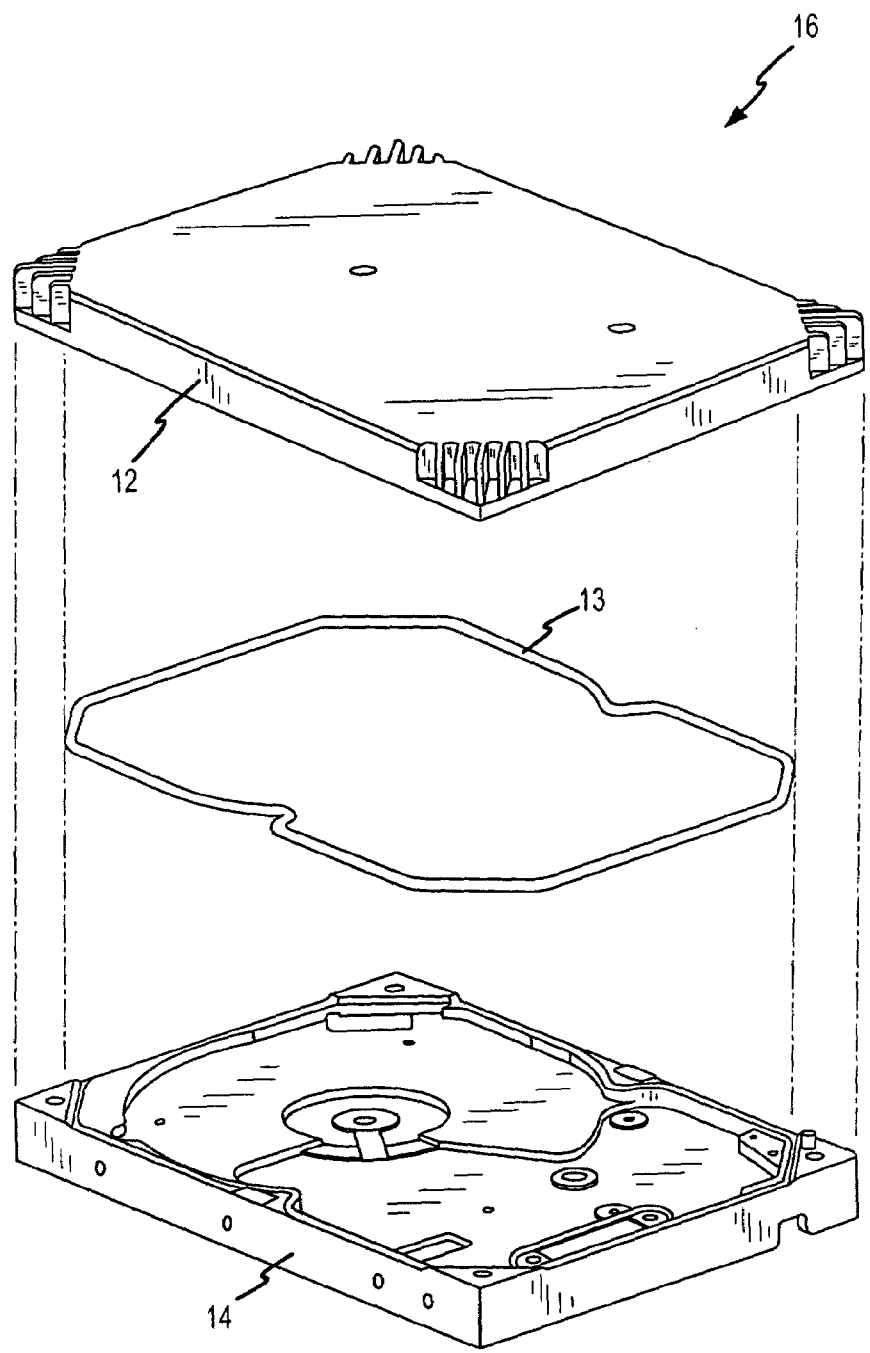
FIG. 2 is an exploded, perspective view of a prior art disk drive housing for the disk drive of FIG. 1.

A disk drive 10 that may be adapted to include a printed circuit board assembly with a power plug cover is illustrated in FIGS. 1–4. The disk drive 10 generally includes a disk drive housing 16 of any appropriate configuration that defines an enclosed space for the various disk drive components. Here the housing 16 includes a base plate 14 that is typically detachably interconnected with a cover 12. A suitable gasket 13 may be disposed between the cover 12 and the base plate 14 to enhance the seal therebetween.

The disk drive 10 includes one or more data storage disks 18 of any appropriate computer-readable data storage media. Typically both of the major surfaces of each data storage disk 18 include a plurality of concentrically disposed tracks for data storage purposes. Each disk 18 is mounted on a hub by a disk clamp 22, and the hub is rotatably interconnected with the disk drive base plate 14 and/or cover 12. A spindle motor rotates the hub and attached clamp 22 about a shaft 24 of the spindle motor to simultaneously spin the data storage disk(s) 18 at an appropriate rate.

The disk drive 10 also includes a head positioner assembly 26, that in turn includes an actuator 27. The actuator 27 is in the form of an actuator body 28 having one or more individual rigid actuator arms 30 extending therefrom. This actuator body 28 is mounted on a pivot bearing 34. Each actuator arm 30 pivots about the pivot bearing 34, which in turn is rotatably supported by the base plate 14 and/or cover 12. Multiple actuator arms 30 are disposed in vertically spaced relation, with one actuator arm 30 typically being provided for each major data storage surface of each data storage disk 18 of the disk drive 10. Other actuator configurations could be utilized as well, such as an "E" block having one or more rigid actuator arm tips or the like that cantilever from a common structure, or one or more rigid actuator arms that are each mounted on the pivot bearing 34.

Movement of the head positioner assembly 26 is provided by an appropriate head stack assembly drive, such as a voice coil motor 62 or the like. The voice coil motor 62 may be characterized as a rotary drive. The voice coil motor 62 is a magnetic assembly that controls the movement of the head positioner assembly 26 under the direction of control electronics 66. Typical components of the voice coil motor 62 are a coil 63 that may be mounted on the head positioner assembly 26, and a separate voice coil motor magnet assembly, ("VCM Assembly") 64 that is disposed above and below this coil 63 (the upper VCM assembly 64 being "exploded away" in FIG. 1). The VCM magnet assemblies 64 will typically be mounted on the housing 16 in a fixed position, with the upper VCM assembly 64 being appropriately supported above the lower VCM assembly. Any appropriate head positioner assembly drive type may be utilized by the disk drive 10, including a linear drive (for the case where the head positioner assembly 26 is interconnected with the base plate 14 and/or cover 12 for linear movement versus the illustrated pivoting movement about the pivot bearing 34), as well as other types of rotational/pivoting drives.

A head-gimbal assembly or HGA 36 is interconnected with each actuator arm 30 and includes a load beam or suspension 38 that is attached to the free end of each actuator arm 30 or actuator arm tip, and cantilevers therefrom. All HGAs 36 are part of the head positioner assembly 26. Typically the suspension 38 of each HGA 36 is biased at least generally toward its corresponding disk 18 by a spring-like force. A slider 42 is disposed at or near the free end of each suspension 38. What is commonly referred to in the art as the "head" 44 (e.g., at least one transducer) is appropriately mounted on the slider 42 and is used in disk drive read/write operations. Various types of read/write technologies may be utilized by the head 44 on the slider 42. In any case, the biasing forces exerted by the suspension 38 on its corresponding slider 42 thereby attempt to move the slider 42 in the direction of its corresponding disk 18. Typically this biasing force is such that if the slider 42 were positioned over its corresponding disk 18, without the disk 18 being rotated at a sufficient velocity, the slider 42 would be in contact with the disk 18.

Each head 44 is interconnected with the control electronics 66 of the disk drive 10 by a flex cable 70 that is typically mounted on the head positioner assembly 26. Signals are exchanged between the head 44 on the slider 42 and its corresponding data storage disk 18 for disk drive read and/or write operations. In this regard, the voice coil motor 62 pivots the actuator arm(s) 30 to simultaneously move each head 44 on its slider 42 "across" the corresponding data storage disk 18 to position the head 44 at the desired/required radial position on the disk 18 (i.e., at the correct track on the data storage disk 18) for disk drive read/write operations.

When the disk drive 10 is not in operation, the head positioner assembly 26 is pivoted to a "parked position" to dispose each slider 42 in a desired position relative to its corresponding data storage disk 18. The "parked position" may be at least generally at or more typically beyond a perimeter of its corresponding data storage disk 18 or at a more interior location of the corresponding disk 18, but in any case typically in vertically spaced relation to its corresponding disk 18. This is commonly referred to in the art as being a dynamic load/unload disk drive configuration. In this regard, the disk drive 10 may include a ramp assembly that is disposed beyond a perimeter of the data storage disk 18 to typically both move the corresponding slider 42 vertically away from its corresponding data storage disk 18 and to also exert somewhat of a retaining force on the corresponding actuator arm 30. Any configuration for the ramp assembly that provides the desired "parking" function may be utilized. The disk drive 10 could also be configured to be of the contact start/stop type, where each actuator arm 30 would pivot in a direction to dispose the slider(s) 42 typically toward an inner, non-data storage region of the corresponding data storage disk 18. Terminating the rotation of the data storage disk(s) 18 in this type of disk drive configuration would then result in the slider(s) 42 actually establishing contact with or "landing" on their corresponding data storage disk 18, and the slider 42 would remain on the disk 18 until disk drive operations are re-initiated. In either configuration, it may be desirable to at least attempt to retain the actuator arm(s) 30 in this parked position if the disk drive 10 is exposed to a shock event. In this regard, the disk drive 10 may include an actuator arm assembly latch that moves from a non-latching position to a latching position to engage an actuator arm 30 so as to preclude the same from pivoting in a direction which would tend to drag the slider(s) 42 across its corresponding data storage disk 18.

Figure 3:
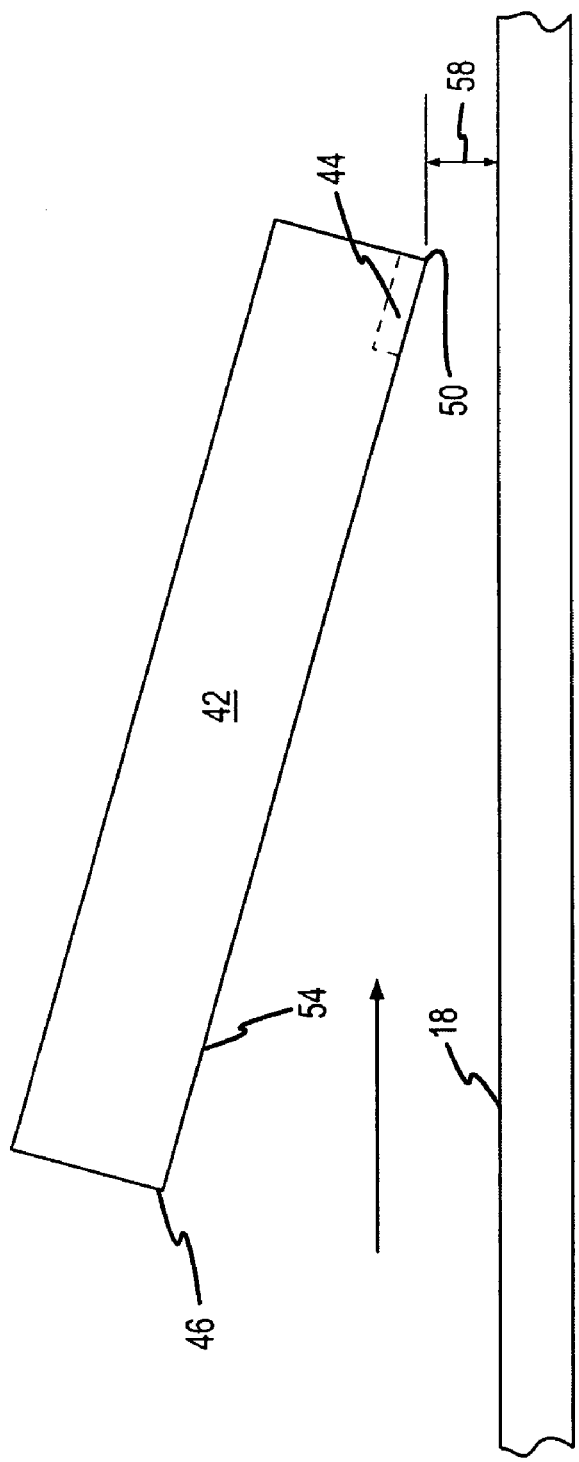
FIG. 3 is a schematic representation of a prior art flying-type slider that may be used by the disk drive of FIG. 1.

The slider 42 of the disk drive 10 may be configured to "fly" on an air bearing during rotation of its corresponding data storage 18 at a sufficient velocity. This is schematically illustrated in FIG. 3 where a lower surface 54 of the slider 42 would include an appropriate air-bearing-surface (ABS) system (not shown). Here the direction of the rotation of the disk 18 relative to the slider 42 is represented by the arrow, while the fly height of the slider 42 is represented by reference numeral 58 (measured from a reference plane of the mean of the surface roughness of the disk 18). In FIG. 3, the slider 42 is disposed at a pitch angle such that its leading edge 46 of the slider 42 is disposed further from its corresponding data storage disk 18 than its trailing edge 50. The transducer(s) 44 would typically be incorporated on the slider 42 at least generally toward its trailing edge 50 since this is positioned closest to its corresponding disk 18. Other pitch angles could be utilized for flying the slider 42. The disk drive 10 could also be configured for contact or near-contact recording (not shown).

Figure 4:
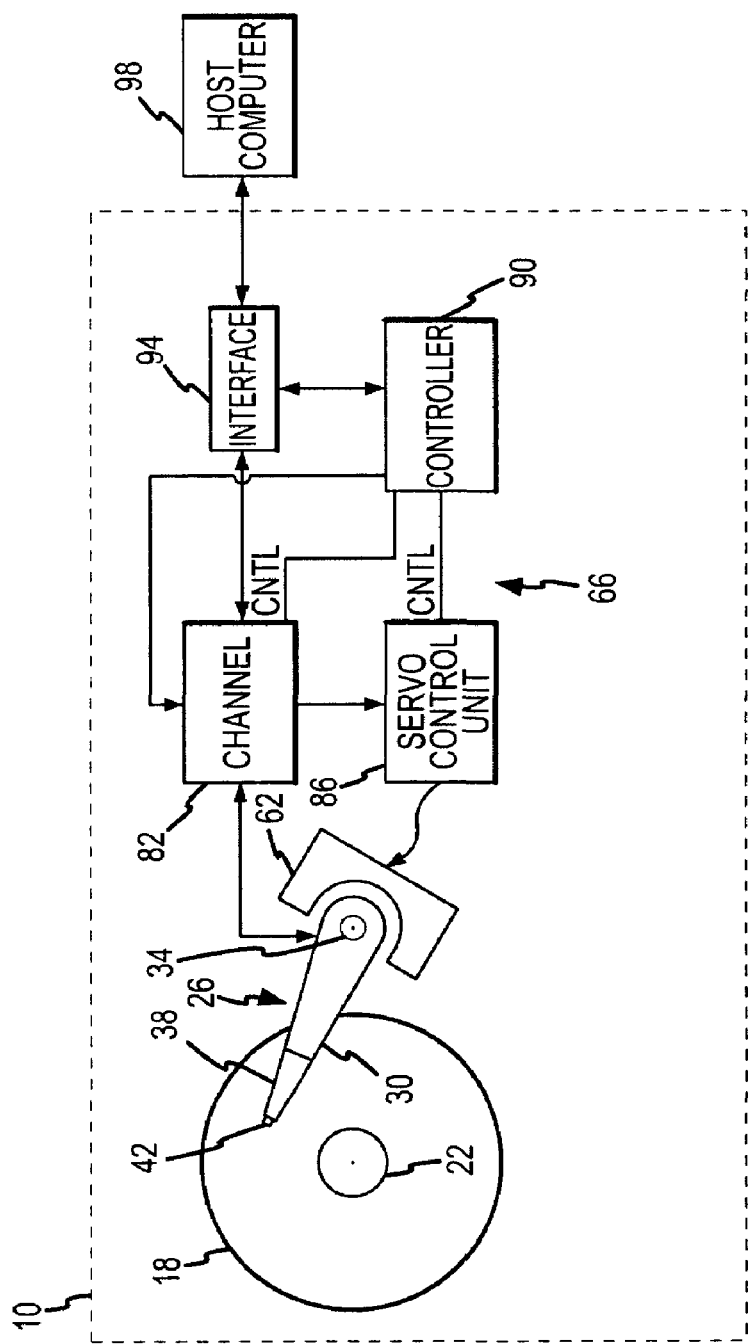
FIG. 4 is a simplified prior art electrical component block diagram that may be used by the disk drive of FIG. 1.

FIG. 4 illustrates a simplified electrical component block diagram of the disk drive 10 of FIG. 1. The control electronics 66 in this case includes a controller 90 and a servo control unit 86. The disk drive 10 in FIG. 4 also includes a channel 82, as well as an interface 94 for interconnecting the disk drive 10 with a host computer 98. During operation of the disk drive 10, the data storage disk 18 rotates. Data is stored on the data storage disk 18 in substantially concentric tracks. Data may be read from or written to the data storage disk 18 by moving the slider 42 and its head 44 to the desired track and performing the desired communication operation (i.e., a read or write operation). In one embodiment, the data storage disk 18 includes a magnetic media having concentric read/write tracks and the head 44 includes at least one transducer that is capable of communicating with this magnetic data storage disk 18.

The voice coil motor 62 receives servo control information from the servo control unit 86 to cause the voice coil motor 62 to move each actuator arm 30 and its corresponding head 44 when repositioning of the head(s) 44 is desired/required. In this regard, the head(s) 44 may periodically read positioning information from the surface of the corresponding data storage disk 18 and transmit the positioning information to the servo control unit 86 via the channel 82. The servo control unit 86 compares the present position of the head(s) 44 to a desired position, with movement of the actuator arm(s) 30 being made as required for proper track alignment.

The channel 82 receives a number of inputs for processing so that data may be manipulated by the devices internal- and external, such as the host computer 98, which is again interconnected with the disk drive 10 via the interface 94. One operation of the channel 82 is to receive an analog signal from the head(s) 44 and to convert the analog signal to a digital signal recognized by the host computer 98. In addition, the channel 82 facilitates the storage of information from the host computer 98 to the data storage disk(s) 18 by encoding data signals from the host computer 98 and creating a write signal, from the encoding data, which is transmitted to the head(s) 44 for storage on the corresponding data storage disk 18.

The controller 90 controls the timing and operation of other elements of the disk drive 10. The controller 90 receives input/output requests from the host computer 98 via the interface 94. Based on the input to the controller 90, the controller 90 delivers appropriate commands to the servo control unit 86 and the channel 82. For example, in a read operation, the controller 90 commands the servo control unit 86 to move the head(s) 44 to the desired track on the corresponding data storage disk 18 such that the data written on the disk 18 may be transferred to the host computer 98. Accordingly, the servo control unit 86 moves the head(s) 44 to the desired track on the corresponding data storage disk 18 using the servo positioning information read from the data storage disk 18 by the corresponding head 44. In turn, the head(s) 44 reads the information from the corresponding data storage disk 18 and transmits information to the channel 82 that converts the information so that it may be interpreted by the host computer 98.

Figure 5:
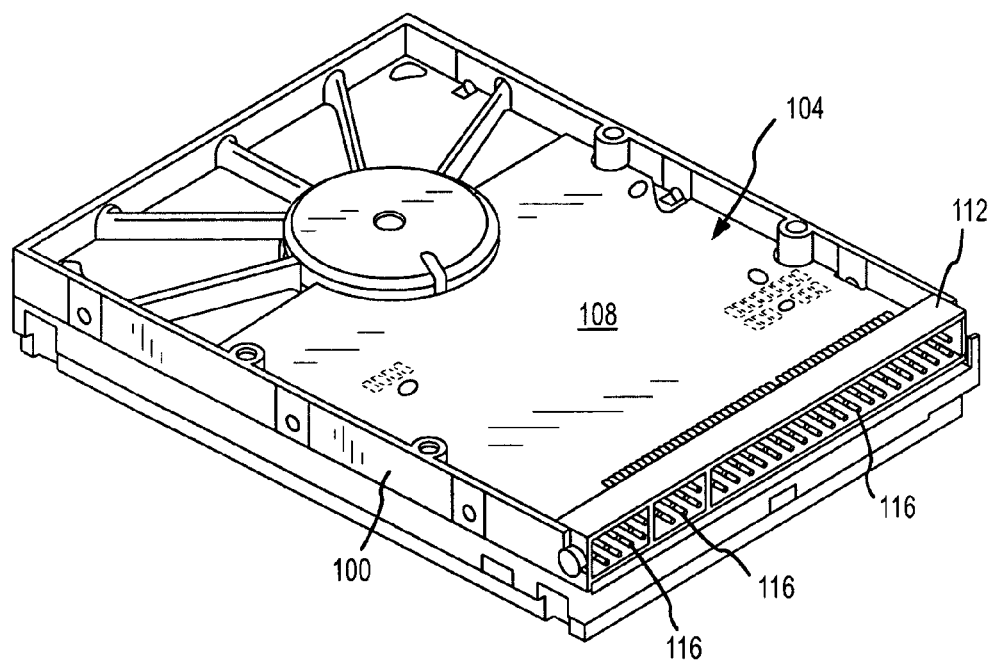
FIG. 5 is a perspective view of a prior art printed circuit board assembly that is mounted on a disk drive base plate, but that may be adapted to include a power plug cover.

FIG. 5 illustrates a printed circuit board assembly 104 that is installed on a base plate 100 at least generally of the type used by the disk drive 10 of FIGS. 1–4, and that may be adapted to include a power plug cover. The disk drive components discussed above in relation to FIG. 1 would be located on the opposite side of the base plate 100 from that of the printed circuit board assembly 104. Any way of mounting the printed circuit board assembly 104 to the base plate 100 may be utilized. Preferably, the printed circuit board assembly 104 is maintained in a fixed position relative to the base plate 100.

The printed circuit board assembly 104 includes a printed circuit board 108 and a connector 112. The connector 112 includes a plurality of pins 116 for establishing a desired/required electrical connection with electrical components, contacts, and/or traces (not shown) on the printed circuit board 108. These pins 116 may be arranged in one or more groups to provide a specific function (e.g., to provide electrical power to the printed circuit board 108). A "mating" connector may interface with one or more of these pins 116, for instance to electrically interconnect the printed circuit board 108 with a power supply (not shown).

Figure 6:
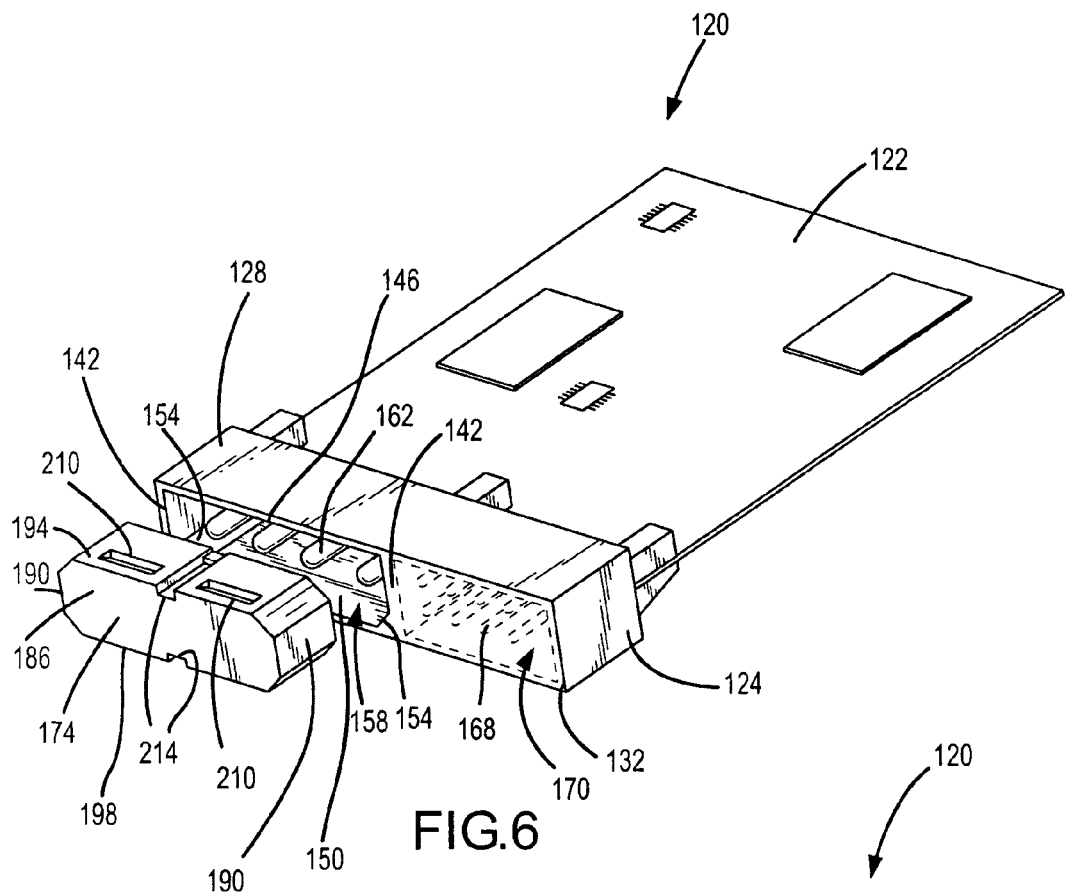
FIG. 6 is an exploded, perspective view of one embodiment of a printed circuit board assembly having a power plug cover.
Figure 7:
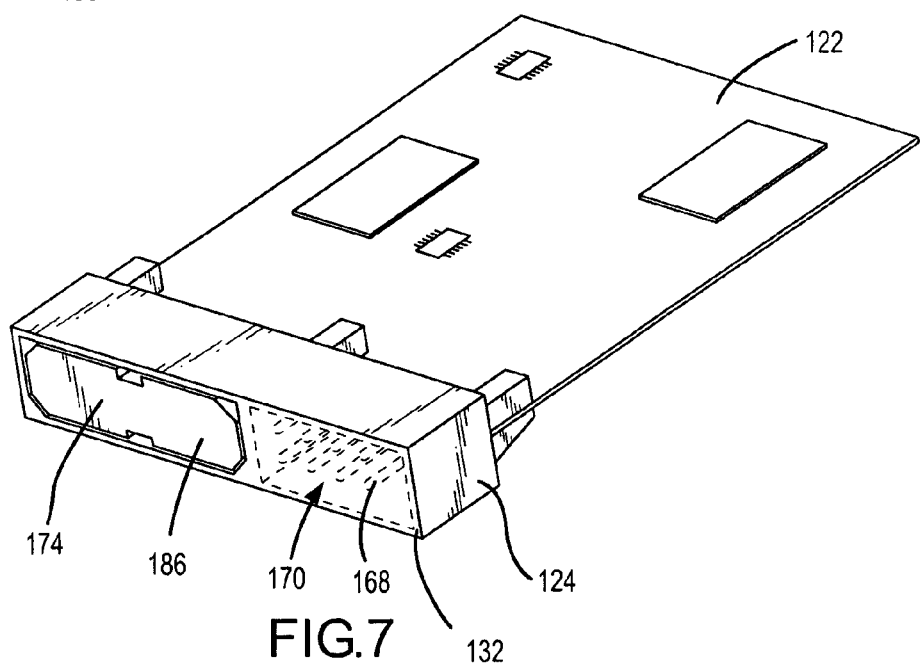
FIG. 7 is a perspective view of the printed circuit board assembly of FIG. 6, with the power plug cover being fully interconnected with a power connector plug.

FIGS. 6–7 illustrate one embodiment of a printed circuit board assembly 120. The printed circuit board assembly 120 may be installed on a base plate of a disk drive at least generally in the manner presented in FIG. 5, and may be for serial ATA. Any way of mounting the printed circuit board assembly 120 to a disk drive base plate may be utilized. In fact, the printed circuit board assembly 120 may be installed on any appropriate peripheral and in any appropriate manner. For instance, the printed circuit board assembly 120 also may be appropriate for use in a floppy drive, a CD-ROM (e.g., ATAPI), and DVD-ROMS. It should be appreciated that one or more features of the printed circuit board assembly 120 may need to be modified in some manner, depending upon the relevant requirements of the peripheral with which it is to be used.

The printed circuit board assembly 120 includes a printed circuit board 122, a power connector plug 124, and a power plug cover 174. Generally, the power plug cover 174 is configured to be installed in the power connector plug 124 to capture or "enclose" at least the end portion of each of the power pins 162 of the power connector plug 124, but without actually contacting the pins 162. The interface between the power plug connector 124 and the outer perimeter of the power plug cover 174 retains the power plug cover 174 in a stationary position relative to the power plug connector 124, or stated another way this interface maintains the "mating" connection between the power plug cover 174 and the power connector plug 124.

The printed circuit board 122 may be of any appropriate size, shape, and configuration, and may include any appropriate number and arrangement of electrical components. The power connector plug 124 may be mounted on the printed circuit board 122 in any appropriate manner, but preferably such that the power connector plug 124 remains in a fixed position relative to the printed circuit board 122. The power connector plug 124 is referred to as such since it includes the "male" components for the electrical connection with a power supply connector that may be interconnected with the power connector plug 124 to provide power from a power supply to the printed circuit board 122. The power supply connector of the power supply that would typically be connected with the power connector plug 124 is commonly referred to as the power connector receptacle since it includes the "female" components for the electrical connection with the power connector plug 124.

The power connector plug 124 generally includes a connector housing 128 that may be of any appropriate size, shape, and configuration, and may be formed from any appropriate material. Typically, the connector housing 128 will be in the form of a polymer. In any case, the connector housing 128 includes at least a first cavity 158 for receiving a mating connector receptacle. The connector housing 128 may include one or more additional cavities, such as a second cavity 170 that is illustrated in dashed lines in FIGS. 6–7. A plurality of power pins 162 (electrical conductors) are disposed in the first cavity 158, while a plurality of pins 168 (electrical conductors) are disposed in the second cavity 170. Power may be provided to the printed circuit board 122 either through the set of power pins 162 or through the set of pins 168. However, the pins 162, 168 may be used for any appropriate purpose. Any number of pins 162, 168 may be utilized, they may be of any appropriate size and configuration, and they may be disposed in any appropriate relative orientation/arrangement. There are four power pins 162 in the illustrated embodiment, and each of the pins 162 have their respective centers disposed in a common reference plane. The power connector plug 124 may in fact be configured to include only the pins 162 (not shown).

Figure 8A:
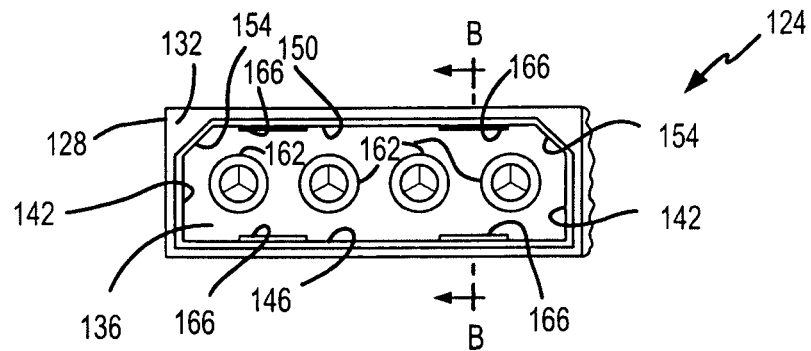
FIG. 8A is an end view of a prior art power connector plug used by the printed circuit board assembly of FIGS. 6–7.
Figure 8B:
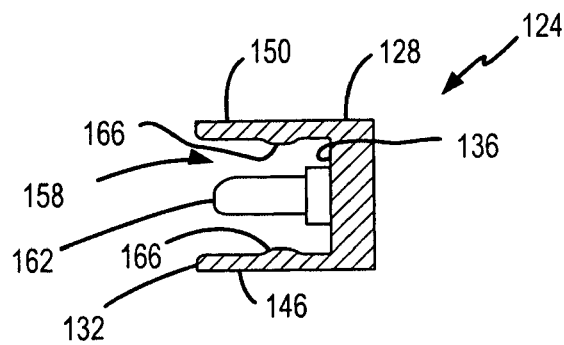
FIG. 8B is a cross-sectional view of the power connector plug of FIG. 8A, taken along line B—B.

Additional views of the power connector plug 124, more specifically its first cavity 158, are illustrated in FIGS. 8A–B. It should be noted that the orientation of the power connector plug 124 is inverted in FIGS. 8A–B compared to FIGS. 6–7. The first cavity 158 is externally accessible on a first housing end 132 of the connector housing 128, and is an open space that is collectively defined by an end wall 136 (on/through which the pins 162 extend), a pair of side walls 142, an upper wall 146, a lower wall 150, and a pair of chamfered corner walls 154 of the connector housing 128.

Each chamfered corner wall 154 of the connector housing 128 extends from the lower wall 150 to one of the side walls 142, and is disposed at an angle other than 90 degrees relative to the lower wall 150. In one embodiment, each chamfered corner wall 154 is disposed at an angle of about 45 degrees relative to the lower wall 150. Other angular orientations may be utilized. Generally, the chamfered corner walls 154 provide a "registration feature" for the above-noted power connector receptacle that may be disposed within the first cavity 158 to provide power from a power supply to the pins 162, and thereby the printed circuit board 122. That is, such a power connector receptacle can only be installed in one orientation in the first cavity 158 of the power connector plug 124, as it typically includes corresponding registration features such that it cannot be installed "upside down" within the first cavity 158. Any appropriate registration features or features may be used by the power connector plug 124.

The connector housing 128 includes a plurality of protrusions 166 that extend into the first cavity 158. In the illustrated embodiment, a pair of protrusions 166 are formed on both the upper wall 146 and lower wall 150, and extend within the first cavity 158. Any number of protrusions 166 may be utilized on the upper wall 146 and/or lower wall 150. These protrusions 166 interface with a corresponding recess formed on the above-noted power connector receptacle when installed within the first cavity 158 to provide electrical power to the printed circuit board 122 through the pins 162. Although the interaction between these protrusions 166 and the recesses formed on the power connector receptacle may provide for some retention force between the power connector plug 124 and the power connector receptacle, the majority (greater than 50%, and more typically on the order of at least about 90%) of the retention forces between the power connector plug 124 and the power connector receptacle are the interaction of the male power pins 162 of the power connector plug 124 with the "female contacts" on the power connector receptacle. That is, the power pins 162 of the power connector plug 124 are in contact with the female contacts of the power connector receptacle not only to provide an electrical interconnection, but also such that each female contact is forcibly retained on its corresponding power pin 162 to maintain the interconnection between the power connector plug 124 and the power connector receptacle (e.g., the female contacts are "spring loaded"). That is, the female contacts of the power connector receptacle in effect "grip" their corresponding power pin 162. In contrast, these protrusions 166 provide the majority of the retention forces (greater than 50%, and more typically 100%) that maintain the mating relation between the power connector plug 124 and the power plug cover 174.

The power plug cover 174 may be installed over the power pins 162 of the power connector plug 124 at any time when the above-noted power connector receptacle is not interconnected with the power connector plug 124 and for any purpose. For instance, the power plug cover 174 may be installed to reduce the potential for damaging the power pins 162 in some manner when the power connector receptacle and power connector plug 124 are not interconnected (e.g., during shipping of the printed circuit board assembly 120 for installation on the relevant peripheral). The power connector plug 174 may also be installed to reduce the potential for injuring any personnel that may be handling the printed circuit board assembly 120 at a time when the power connector receptacle and power connector plug 124 are not interconnected.

Additional views of the power plug cover 174 of the printed circuit board assembly 120 are presented in FIGS. 9A–F. The power plug cover 174 is in the form of a solid, one-piece body in the illustrated embodiment that may be formed from any appropriate material. In one embodiment, the power plug cover 174 is formed from an appropriate polymer. The cover 174 includes a first end surface or a first end 182 and an oppositely disposed second end surface or second end 186, a top surface or top 194 and an oppositely disposed bottom surface or bottom 198, a pair of oppositely disposed side surfaces or sides 190, and four chamfered corner surfaces or corners 202 extending between each side 190 and each of the top 194 and bottom 198. The upper half and lower half of the power plug cover 174 are preferably the mirror image of each other. As such, the power plug cover 174 may be installed in the first cavity 158 with either the top 194 or bottom 198 disposed adjacent to the upper wall 146 of the connector housing 128 of the power connector plug 124. Stated another way, the power plug cover 174 may be installed in the first cavity 158 of the power connector plug 124 in either a first orientation or a second orientation (one where the top 194 is located above the bottom 198, and another where the bottom 198 is located above the top 194 by inverting the cover 174). Therefore, the cover 174 may be installed on the power connector plug 124 "right side up" or "upside down." Once again, the above-noted power connector receptacle can be installed on the power connector plug 124 in only one orientation.

The first end 182 of the cover 174 includes a plurality of power pin holes 206 that extend within, but not to, the second end 186. As such, the end of each power pin hole 206 that is on the first end 182 is open, while its opposite end is closed. One power pin hole 206 is included on the power plug cover 174 for each power pin 162 used by the power connector plug 124, and the power pin holes 206 are arranged in the same manner as the pins 162 of the power connector plug 124. That is, each power pin 162 of the power plug connector 124 will be aligned with one power pin hole 206 on the cover 174. There are thereby four power pin holes 206 in the illustrated embodiment, with the center of each power pin hole 206 being disposed within a common plane. Again, the relative arrangement of the holes 206 will be selected to match the arrangement of the pins 162.

None of the power pin holes 206 in the cover 174 intersect. Moreover, the material that defines the cover 174 occupies the volume between adjacent holes 206. A rib 218 extends from the top 194 of the cover 174 to the bottom 198 of the cover 174 between each adjacent pair of holes 206, and between each side 190 and the adjacent-most hole 206. Each such rib 218 extends the entire distance between the first end 182 and the second end 186 of the cover 174 in the illustrated embodiment as well. This provide structural integrity for the cover 174, particularly in view of the manner in which the cover 174 is forcibly retained within the power connector plug 124 as will be discussed in more detail below. In the illustrated embodiment, the cover 174 is a solid body, with the only interior openings being the power pin holes 206. There are no holes or open spaces between adjacent holes 206 along their entire progression through the cover 174.

Each power pin hole 206 is larger than its corresponding power pin 162. As such, when the power plug cover 174 is installed in the first cavity 158 of the power connector plug 124, there is no contact between any of the power pins 162 and the power plug cover 174. That is and for the installed position illustrated in FIG. 7, there is an open space between each power pin 162 of the power connector plug 124 and the entirety of the power plug cover 174. Therefore, the power pins 162 do not provide any retention forces, or forces that maintain the interconnection between the power connector plug 124 and the cover 174. Moreover, having the cover 174 configured to avoid contacting the pins 162 reduces the potential for corrosion of the pins 162.

Figure 10:
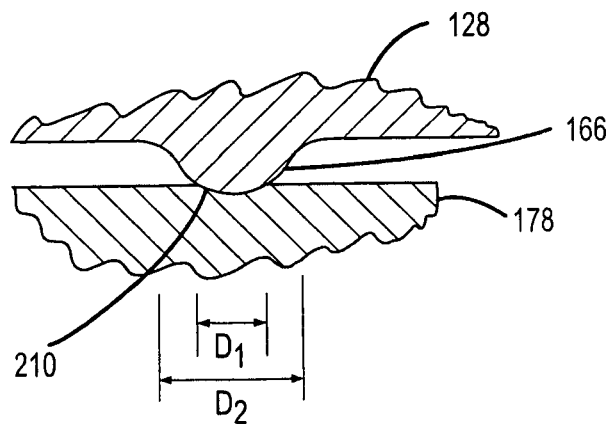
FIG. 10 is a cross-sectional view, illustrating an interference fit between the power plug cover and power connector plug of the printed circuit board assembly of FIGS. 6–7.
Figure 9A:
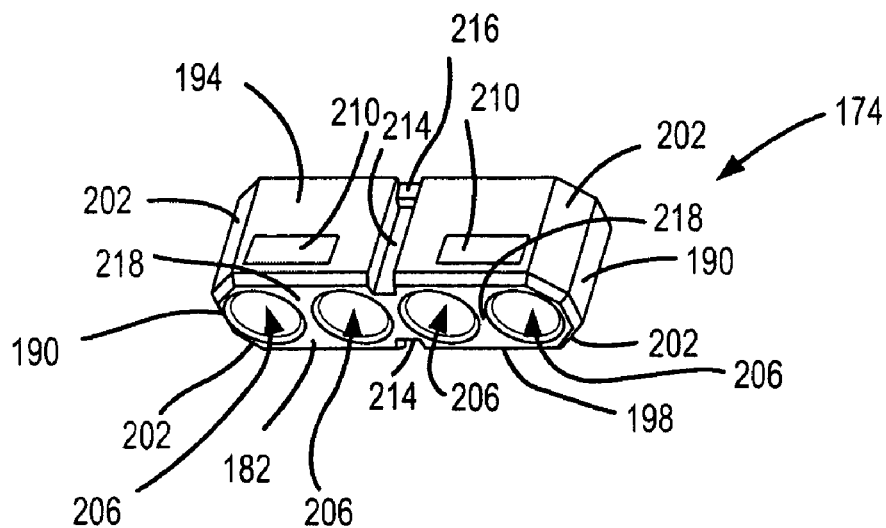
FIG. 9A is a perspective view of the power plug cover of FIGS. 6–7.
Figure 9B:
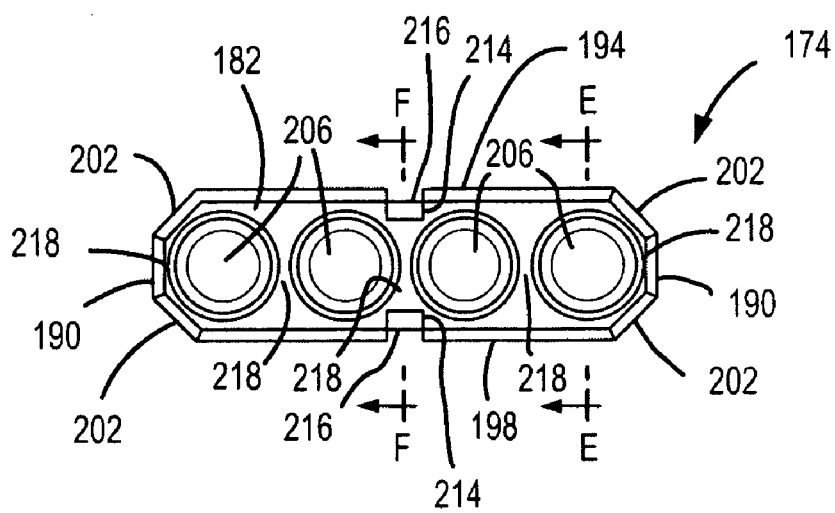
FIG. 9B is a plan view of one end of the power plug cover of FIG. 9A.
Figure 9C:
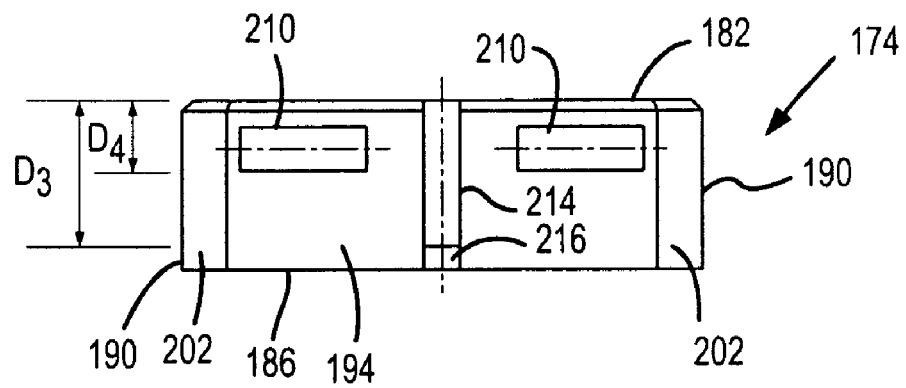
FIG. 9C is a top view of the power plug cover of FIG. 9A.
Figure 9D:
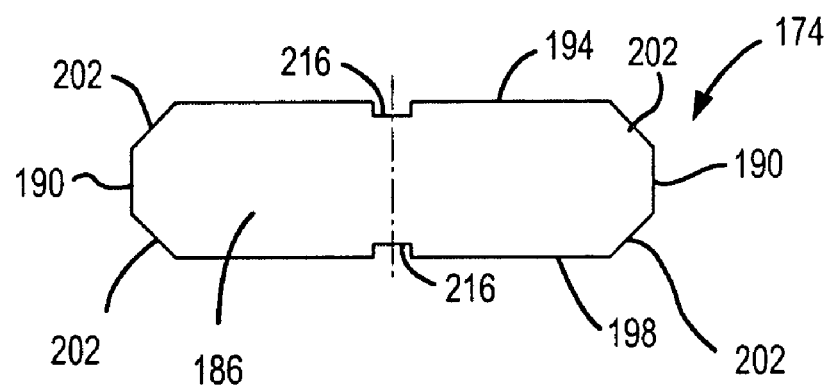
FIG. 9D is plan view of another end of the power plug cover of FIG. 9A.
Figure 9E:
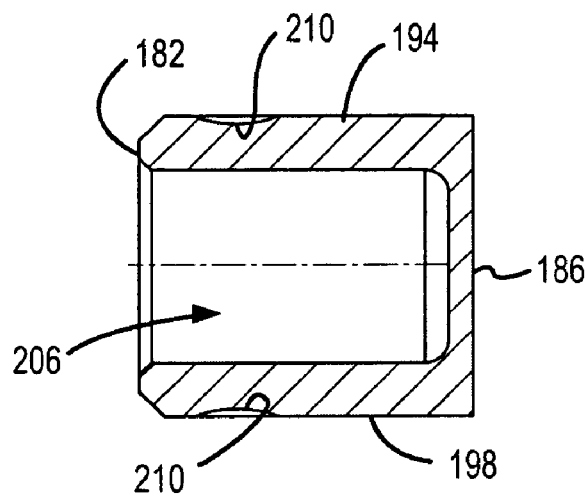
FIG. 9E is a cross-sectional view of the power plug cover of FIG. 9A, taken along line E—E.
Figure 9F:
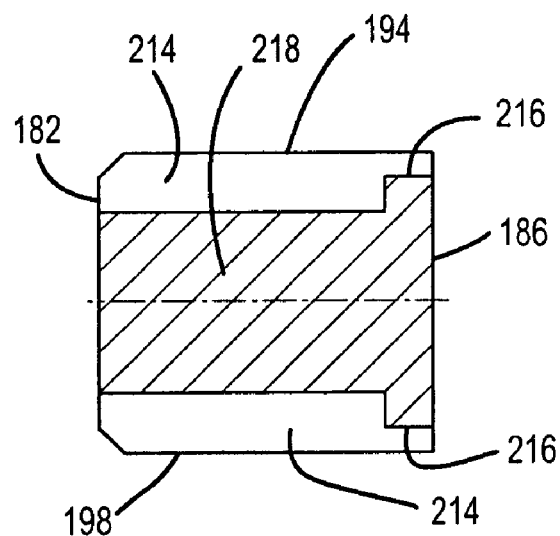
FIG. 9F is a cross-sectional view of the power plug cover of FIG. 9A, taken along line F—F.

An interference fit or snap-lock connection exists between the connector housing 128 and the exterior of the cover 174. In this regard, the power plug cover 174 includes a corresponding recess 210 for each protrusion 166 used by the power connector plug 124. In the illustrated embodiment, a pair of recesses 210 are formed on both the top 194 and bottom 198 of the power plug cover 174. FIG. 10 illustrates the interface between one of the protrusions 166 of the power connector plug 124 and one of the recesses 210 of the power plug cover 174. Each protrusion 166 is preferably in the form of an arcuate surface. Less than the entirety of this arcuate surface is engaged by its corresponding recess 210 on the power plug cover 174 in the illustrated embodiment. This is subject to a number of characterizations. One is that the width of each recess 210 (corresponding with dimension $D_1$ in FIG. 10), is less than the width of each protrusion 166 (dimension $D_2$). Another is that each recess 210 only engages the apex of its corresponding protrusion 166. In one embodiment, the width of each recess 210 (again, corresponding with dimension $D_1$ in FIG. 10), is no more than about 1.87 mm, while the depth of each such recess 210 is on the order of no more than about 0.15 mm.

Engagement of the protrusions 166 of the power connector plug 124 with the corresponding recess 210 of the power plug cover 174 provide a snap-lock interconnection or interference fit between the power plug cover 174 and the outer perimeter of the power connector plug 124 in the installed position of FIG. 7. Specifically, the cover 174 is compressed between the protrusions 166 that are disposed in the recesses 210 on the top 194 and bottom 198 of the cover 174, and that are in engagement with the outer perimeter of the cover 174. Preferably, an audible indication is generated when the protrusions 166 become seated in their corresponding recess 210 (e.g., a "clicking" sound). Generally, the upper wall 146 and lower wall 150 of the connector housing 128 will deflect away from each other (e.g., elastically) as the cover 174 is being installed. That is, when the protrusions 166 engage portions of the top 194 and bottom 198 of the cover 174 at locations other than the recesses 210 during the installation, the upper wall 146 and lower wall 150 of the connector housing 128 will deflect a certain amount at least generally away from each other. When the protrusions 166 become aligned with their corresponding recess 210 on the cover 174, the upper wall 146 and lower wall 150 will attempt to move back toward their original, undeflected state. This creates the noted "clicking" sound. Preferably, the upper wall 146 and lower wall 150 are still somewhat deflected when the protrusions 166 are disposed in their corresponding recess 210 to provide the desired interference fit. In any case, a "tight" interface exists between the cover 174 and the power connector plug 124. Typically the contact between the cover 174 and the connector housing 128 will be limited to those portions of the protrusions 166 that contact the exterior of the cover 174 within the corresponding recess 210. As such, a small space or gap will typically exist between the remainder of the exterior of the cover 174 and the power connector housing 128 (i.e., a gap will exist between the connector housing 128 and the outer perimeter of the cover 174, except where contacted by the protrusions 166). In any case, the cover 174 remains in a fixed position (i.e., stationary) relative to the power connector plug 124, including while moving the power connector plug 124. Stated another way, the cover 174 does not "rattle" when installed in the power connector plug 124 and while "shaking" the power connector plug 124 by hand.

The majority (i.e., greater than 50%) of the forces that maintain the interconnection between the power connector plug 124 and the cover 174 are based upon the engagement of the protrusions 166 with the outer perimeter of the cover 174. Preferably, 100% of the retention forces are due to the engagement of the protrusions 166 on the outer perimeter of the cover 174 since the pins 162 of the power connector plug 124 are again preferably spaced from the cover 174. If there was to be some inadvertent contact between any of the pins 162 and the cover 174, the retention force collectively provided by the engagement of the protrusions 166 with the outer perimeter of the cover 176 would still be greater than any collective retention force provided by each pin 162 that was in contact with the cover 176.

When the cover 174 is fully installed in the power connector plug 124, the second end 186 of the power plug cover 174 is either flush with or recessed relative to the first housing end 132 of the connector housing 128 of the power connector plug 124 (FIG. 7). Stated another way, the power plug cover 174 does not extend beyond the first housing end 132 in a direction that is away from the plurality of power pins 162 when the power plug cover 174 is fully interconnected with the power connector plug 124. This reduces the potential for being able to remove the cover 176 by hand. Moreover, having the second end 186 being in the form of a flat surface provides a desired "shield" for the pins 162 as well, particularly considering the close fit between the outer perimeter of the cover 174 and the connector housing 128.

Preferably, the power plug cover 174 cannot be removed by hand from the power connector plug 124. The second end 186 of the power plug cover 174 also preferably does not project beyond the first housing end 132 of the power connector plug 124 as noted above. In this regard, the power plug cover 174 includes at least one slot 214 on both its top 194 and bottom 198. Generally, these slots 214 each provide a space of increased size between the connector housing 128 and the outer perimeter of the cover 174 in which an appropriate tool (e.g., screwdriver tip) may be inserted between the power plug cover 174 and the connector housing 128 to "pry" or "pop" each of the protrusions 166 of the power connector plug 124 out of their corresponding recess 210 on the power plug cover 174. In the illustrated embodiment, a tool may be used to deflect the upper wall 146 of the connector housing 128 to move the protrusions 166 on the upper wall 146 out of their corresponding recess 210 on the power plug cover 174. Similarly, a tool may be used to deflect the lower wall 150 of the connector housing 128 to move the protrusions 166 on the lower wall 150 out of their corresponding recess 210 on the power plug cover 174. Any size, shape, and configuration may be utilized for the slots 214 to accommodate the particulars of the cover removal tool or tools. It should be appreciated that the configurations of the power plug cover 174 and/or power connector plug 124 may be adapted for other "locking" interconnections between these components and/or to provide for "unlocking" this interconnection.

The slot 214 on the upper surface 194 is centrally disposed between the recesses 210 on the top 194, as well as centrally between a pair of the power pin holes 206 in the lateral dimension (although the slot 214 is vertically offset from the corresponding holes 206). Similarly, the slot 214 on the bottom 198 is centrally disposed between the recesses 210 on the lower surface 198, as well as centrally between a pair of the power pin holes 206 in the lateral dimension. This disposes each slot 214 centrally between the side walls 142 of the connector housing 128, which maximizes the ability to deflect the upper wall 146 and lower wall 150 of the connector housing 128 out of their corresponding recess 210 on the cover 174 during removal of the power plug cover 174 from the power connector plug 124. Both slots 214 extend from the second end 186 at least toward the first end 182 of the cover 174 (the slot 214 may extend all the way to the first end 182). Each slot 214 extends beyond its corresponding recess 210 in the direction of the first end surface 182 in the illustrated embodiment. The end of each slot 214 is actually disposed a distance $D_3$ from the first end 182. The end of its corresponding recess 210 that is located furthest in the direction of the second end 186 is disposed a distance $D_4$ from the first end 182, and the distance $D_3$ should be at least as great as the distance $D_4$.

A step 216 exists at the end of each slot 214 at its intersection with the second end 186 in the illustrated embodiment. Each step 216 is recessed relative to its corresponding top 194 or bottom 198, but is not as deep as the corresponding slot 214. The steps 216 provide the function of allowing room for an extraction tool of some sort to be inserted.

Figure 11A:
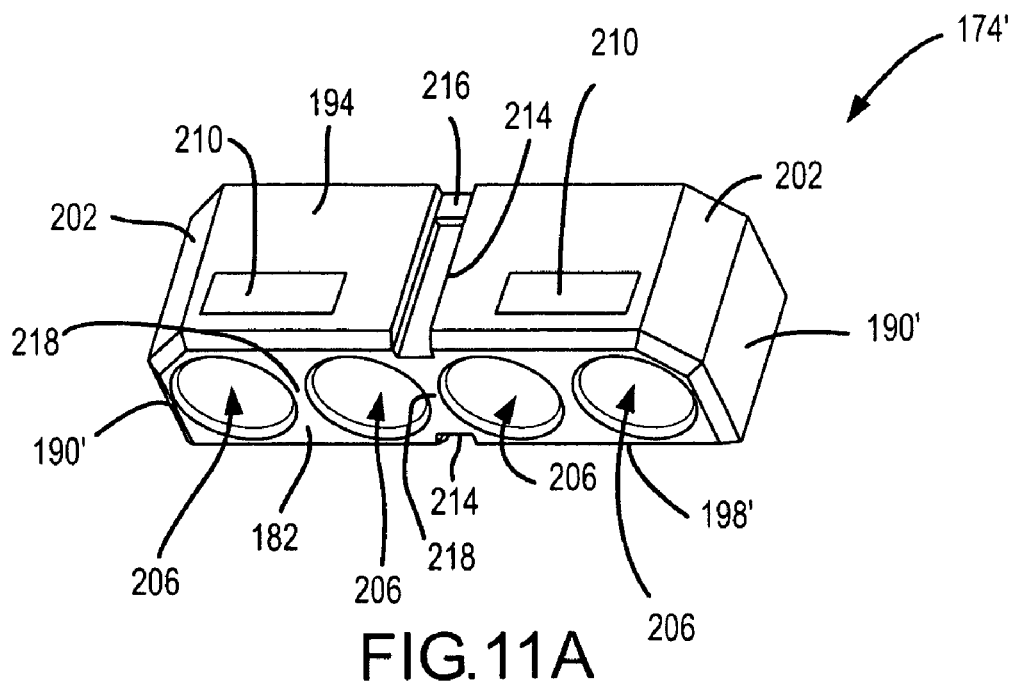
FIG. 11A is a perspective view of an alternative power plug cover that may be used by the printed circuit board assembly of FIGS. 6–7.
Figure 11B:
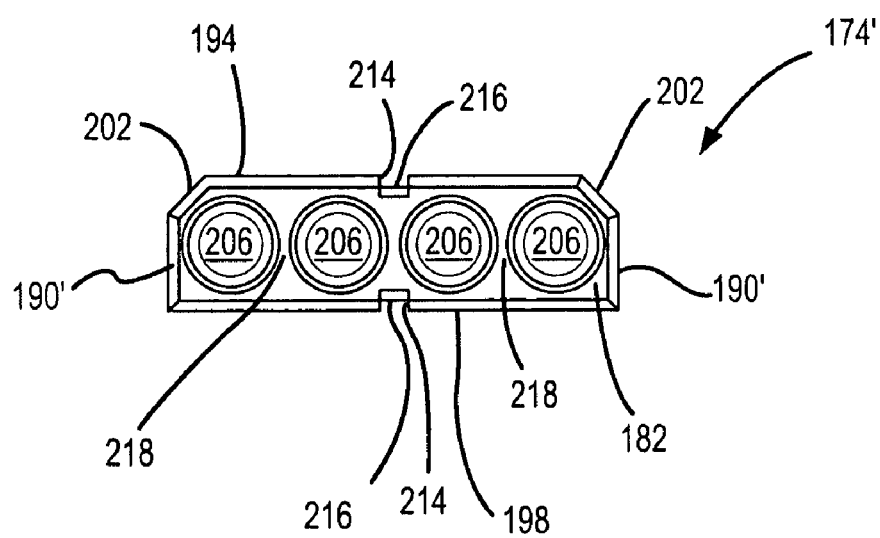
FIG. 11B is a plan view of one end of the power plug cover of FIG. 11A.

An alternative embodiment of a power plug cover is illustrated in FIGS. 11A–B, is similar to the power plug cover 174 of FIGS. 9A–E, and is thereby identified by reference numeral 174' as well, but with a "single prime" designation. The "single prime" designation in relation to the embodiment of FIGS. 11A–B indicates that there is at least one difference from the FIGS. 9A–E embodiment. Corresponding components of these two embodiments are identified by the same reference numeral, and a "single prime" designation is used in relation to those components that differ in at least some respect. The primary difference between these two embodiments is that the cover 174' only utilizes a pair of chamfered corners 202 (between the two sides 190' and the top 194'), versus at all four corners as in the case of the power plug cover 174 of FIGS. 9A–E. Therefore, the power plug cover 174' thereby can only be inserted in the power connector plug 124 in a single orientation. All other aspects of the power plug cover 174' are the same as the power plug cover 174.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A printed circuit board assembly, comprising:
   a printed circuit board;
   a connector plug mounted on said printed circuit board, wherein said connector plug comprises a connector housing, an exteriorly accessible first cavity that extends within said connector housing, and a plurality of pins at least partially disposed in said first cavity; and a cover at least partially disposed in said first cavity, wherein said cover is engaged with at least a portion of said connector housing, and wherein each of said plurality of pins is disposed in spaced relation to an entirety of said cover, wherein said cover comprises a top and a bottom, first and second sides, first and second ends, a first chamfered corner extending between said top and said first side, a second chamfered corner extending between said top and said second side, a third chamfered corner extending between said bottom and said first side, and a fourth chamfered corner extending between said bottom and said second side, wherein said connector housing comprises a pair of chamfered corners, wherein said cover may be disposed within said connector housing in either of first or second orientations, wherein said top of said cover is located above said bottom of said cover in said first orientation, and wherein said bottom of said cover is located above said top of said cover in said second orientation.

2. A printed circuit board assembly, as claimed in claim 1, further comprising:
an interference fit between an outer perimeter of said cover and said connector housing.

3. A printed circuit board assembly, as claimed in claim 1, further comprising:
a snap-lock interconnection between an outer perimeter of said cover and said connector housing.

4. A printed circuit board assembly, as claimed in claim 1, wherein:
said cover comprises an outer perimeter that in turn comprises at least one recess, wherein said connector housing comprises a protrusion disposed within said at least one recess and engaged with said cover.

5. A printed circuit board assembly, as claimed in claim 1, wherein:
each of said top and said bottom comprises at least one recess, wherein said connector housing comprises a corresponding protrusion for each said recess on said top and said bottom of said cover, wherein each said protrusion is disposed within a corresponding said recess and contacts said cover, and wherein said cover is compressed between said protrusions that engage said top and said bottom.

6. A printed circuit board assembly, as claimed in claim 1, wherein:
said connector housing comprises a first housing end, wherein said first cavity is disposed on said first housing end, and wherein said cover is disposed within said connector housing so as to not extend beyond said first housing end in a direction that is away from said plurality of pins.

7. A printed circuit board assembly, as claimed in claim 1, wherein:
said cover comprises a first end, that in turn comprises a plurality of holes that extend into but not through said cover, wherein each of said plurality of pins is disposed within its corresponding said hole and is in spaced relation to an entirety of said cover.

8. A printed circuit board assembly, as claimed in claim 1, wherein:
said cover comprises first and second ends, wherein said first end comprises a plurality of holes that extend toward but not to said second end, that are disposed in spaced relation, and that have a closed end, wherein each of said plurality of pins is disposed within its own said hole in said cover, and wherein said cover individually encloses at least an end portion of each of said plurality of pins.

9. A printed circuit board assembly, as claimed in claim 8, wherein:
said cover is in the form of a solid body and each of said plurality of holes extend into said solid body, wherein a material of said solid body is located between each adjacent pair of said plurality of holes along the entire length dimension of each of said plurality of holes.

10. A printed circuit board assembly, as claimed in claim 1, wherein:
said cover comprises an outer perimeter, wherein said outer perimeter comprises at least one removal recess, wherein a tool may be disposed in said at least one removal recess to facilitate removal of said cover from said connector plug.

11. A printed circuit board assembly, as claimed in claim 1, wherein:
said first end comprises a plurality of holes that extend toward but not to said second end, wherein said second end closes an end of each of said plurality of holes, and wherein each of said plurality of pins is disposed in its own said hole in spaced relation to said cover.

12. A printed circuit board assembly, as claimed in claim 11, wherein:
at least one of said top and said bottom comprises a slot that extends from said second end at least toward said first end, wherein each said slot is located between a center of one of said plurality of holes and a center of an adjacent one of said plurality of holes.

13. A printed circuit board assembly, as claimed in claim 1, wherein:
said cover comprises upper and lower halves that are the mirror image of each other such that cover may be installed in said connector plug in either of first or second orientations.

14. A printed circuit board assembly, comprising:
a printed circuit board;
a connector plug mounted on said printed circuit board, wherein said connector plug comprises a connector housing, an exteriorly accessible first cavity that extends within said connector housing, and a plurality of pins at least partially disposed in said first cavity;
a cover at least partially disposed in said first cavity and comprising a top and a bottom that are oppositely disposed, first and second sides that are oppositely disposed, and first and second ends that are oppositely disposed, wherein said first end comprises a plurality of holes having an oppositely disposed closed end, wherein each of said plurality of pins is disposed in a corresponding one of said plurality of holes, wherein at least one of said top and said bottom comprises a slot that extends from said second end at least toward said first end, wherein each said slot is located between a center of one of said plurality of holes and a center of an adjacent one of said plurality of holes; and
an interference fit between said connector housing and at least one of said top, said bottom, said first side, and said second side of said cover, wherein a majority of a force that retains an interconnection between said cover and said connector plug is provided by said interference fit.

15. A printed circuit board assembly, as claimed in claim 14, wherein:

said interference fit comprises a snap-lock interconnection between said connector housing and an outer perimeter of said cover.

16. A printed circuit board assembly, as claimed in claim 14, wherein:
said cover comprises at least one recess on at least one of said top and said bottom, wherein said connector housing comprises a protrusion disposed within said at least one recess and engaged with said cover.

17. A printed circuit board assembly, as claimed in claim 14, wherein:
said cover is maintained in a stationary position relative to said connector plug during a movement of said connector plug.

18. A printed circuit board assembly, as claimed in claim 14, wherein:
each of said top and said bottom comprises at least one recess, wherein said connector housing comprises a corresponding protrusion for each said recess on said top and said bottom, wherein each said protrusion is disposed within a corresponding said recess and contacts said cover, and wherein said cover is compressed between said protrusions that engage said top and said bottom.

19. A printed circuit board assembly, as claimed in claim 14, wherein:
said connector housing comprises a first housing end, wherein said first cavity is disposed on said first housing end, and wherein said cover extends within said connector housing so as to not extend beyond said first housing end in a direction that is away from said plurality of pins.

20. A printed circuit board assembly, as claimed in claim 14, wherein:
each of said plurality of pins is disposed in spaced relation to an entirety of said cover.

21. A printed circuit board assembly, as claimed in claim 14, wherein:
said cover is in the form of a solid body and each of said plurality of holes extend into said body, wherein a material of said solid body is located between each adjacent pair of said plurality of holes along the entire length dimension of each of said plurality of holes.

22. A printed circuit board assembly, as claimed in claim 14, wherein:
at least one of said top and said bottom comprises at least one removal recess, wherein a tool may be disposed in said at least one removal recess to facilitate removal of said cover from said connector plug.

23. A printed circuit board assembly, as claimed in claim 14, wherein:
said cover comprises upper and lower halves that are the mirror image of each other such that cover may be installed in said power connector plug in either of first or second orientations.

24. A printed circuit board assembly, as claimed in claim 14, wherein:
said cover further comprises a first chamfered corner extending between said top and said first side, a second chamfered corner extending between said top and said second side, a third chamfered corner extending between said bottom and said first side, and a fourth chamfered corner extending between said bottom and said second side, wherein said connector housing comprises a pair of chamfered corners, wherein said cover may be disposed within said connector housing in either of first or second orientations, wherein said top of said cover is located above said bottom of said cover in said first orientation, and wherein said bottom of said cover is located above said top of said cover in said second orientation.

25. A printed circuit board assembly, comprising:
a printed circuit board;
a connector plug mounted on said printed circuit board, wherein said connector plug comprises a connector housing, an exteriorly accessible first cavity that extends within said connector housing, and a plurality of pins at least partially disposed in said first cavity, wherein said connector housing comprises a plurality of protrusions; and
a cover at least partially disposed in said first cavity and comprising a top and a bottom that are oppositely disposed, first and second sides that are oppositely disposed, and first and second ends that are oppositely disposed, wherein said first end comprises a plurality of holes having an oppositely disposed closed end, wherein each of said plurality of pins is disposed in a corresponding one of said plurality of holes, wherein each of said top and bottom comprises at least one recess, wherein each said protrusion of said connector housing is disposed in a corresponding said recess on one of said top and said bottom and contacts said cover, and wherein a first retention force collectively provided by each said protrusion being disposed in its corresponding said recess and engaged with said cover is greater than any collective retention force provided by each of said plurality of pins that may be in contact with said cover.

26. A printed circuit board assembly, as claimed in claim 25, wherein:
a snap-lock connection exists between an outer perimeter of said cover and said connector housing.

27. A printed circuit board assembly, as claimed in claim 25, wherein:
an interference fit exists between an outer perimeter of said cover and said connector housing.

28. A printed circuit board assembly, as claimed in claim 25, wherein:
said cover is maintained in a stationary position relative to said connector plug during a movement of said connector plug.

29. A printed circuit board assembly, as claimed in claim 25, wherein:
said cover is compressed between said protrusions that engage said top and said bottom of said cover.

30. A printed circuit board assembly, as claimed in claim 25, wherein:
said connector housing comprises a first housing end, wherein said first cavity is disposed on said first housing end, and wherein said cover extends within said connector housing so as to not extend beyond said first housing end in a direction that is away from said plurality of pins.

31. A printed circuit board assembly, as claimed in claim 25, wherein:
each of said plurality of pins is disposed in spaced relation to an entirety of said cover.

32. A printed circuit board assembly, as claimed in claim 25, wherein:
said top and said bottom of said cover each extend at least along the entire length dimension of said plurality of holes, wherein said cover lacks any open space between each adjacent pair of said plurality of holes along the entire length dimension of each of said plurality of holes.

33. A printed circuit board assembly, as claimed in claim 25, wherein:
said cover further comprises a first chamfered corner extending between said top and said first side, a second chamfered corner extending between said top and said second side, a third chamfered corner extending between said bottom and said first side, and a fourth chamfered corner extending between said bottom and said second side, wherein said connector housing comprises a pair of chamfered corners, wherein said cover may be disposed within said connector housing in either of first or second orientations, wherein said top of said cover is located above said bottom of said cover in said first orientation, and wherein said bottom of said cover is located above said top of said cover in said second orientation.

34. A printed circuit board assembly, as claimed in claim 25, wherein:
said cover comprises upper and lower halves that are the mirror image of each other such that cover may be installed in said connector plug in either of first or second orientations.

35. A printed circuit board assembly, as claimed in claim 25, wherein:
at least one of said top and said bottom comprises at least one removal recess, wherein a tool may be disposed in said at least one removal recess to facilitate removal of said cover from said connector plug.

36. A printed circuit board assembly, as claimed in claim 25, wherein:
at least one of said top and said bottom comprises a slot that extends from said second end at least toward said first end, wherein each said slot is located between a center of one of said plurality of holes and a center of an adjacent one of said plurality of holes.

37. A printed circuit board assembly, comprising:
a printed circuit board;
a connector plug mounted on said printed circuit board, wherein said connector plug comprises a connector housing, an exteriorly accessible first cavity that extends within said connector housing, and a plurality of pins at least partially disposed in said first cavity; and
a cover at least partially disposed in said first cavity, wherein said cover is engaged with at least a portion of said connector housing, and wherein each of said plurality of pins is disposed in spaced relation to an entirety of said cover, wherein said cover comprises a top and a bottom, first and second sides, and first and second ends, wherein said first end comprises a plurality of holes that extend toward but not to said second end, wherein said second end closes an end of each of said plurality of holes, and wherein each of said plurality of pins is disposed in its own said hole in spaced relation to said cover, wherein at least one of said top and said bottom comprises a slot that extends from said second end at least toward said first end, wherein each said slot is located between a center of one of said plurality of holes and a center of an adjacent one of said plurality of holes.

38. A printed circuit board assembly, comprising:
a printed circuit board;
a connector plug mounted on said printed circuit board, wherein said connector plug comprises a connector housing, an exteriorly accessible first cavity that extends within said connector housing, and a plurality of pins at least partially disposed in said first cavity;
a cover at least partially disposed in said first cavity and comprising a top and a bottom that are oppositely disposed, first and second sides that are oppositely disposed, and first and second ends that are oppositely disposed, wherein said first end comprises a plurality of holes having an oppositely disposed closed end, and wherein each of said plurality of pins is disposed in a corresponding one of said plurality of holes; and
an interference fit between said connector housing and at least one of said top, said bottom, said first side, and said second side of said cover, wherein a majority of a force that retains an interconnection between said cover and said connector plug is provided by said interference fit, wherein said cover further comprises a first chamfered corner extending between said top and said first side, a second chamfered corner extending between said top and said second side, a third chamfered corner extending between said bottom and said first side, and a fourth chamfered corner extending between said bottom and said second side, wherein said connector housing comprises a pair of chamfered corners, wherein said cover may be disposed within said connector housing in either of first or second orientations, wherein said top of said cover is located above said bottom of said cover in said first orientation, and wherein said bottom of said cover is located above said top of said cover in said second orientation.

\* \* \* \* \*